July 14, 1942.   M. SCHLUMBERGER   2,290,075
THERMAL PROCESS AND DEVICE FOR SURVEYING THE BEDS
TRAVERSED BY A DRILL HOLE
Filed April 3, 1939          2 Sheets-Sheet 1
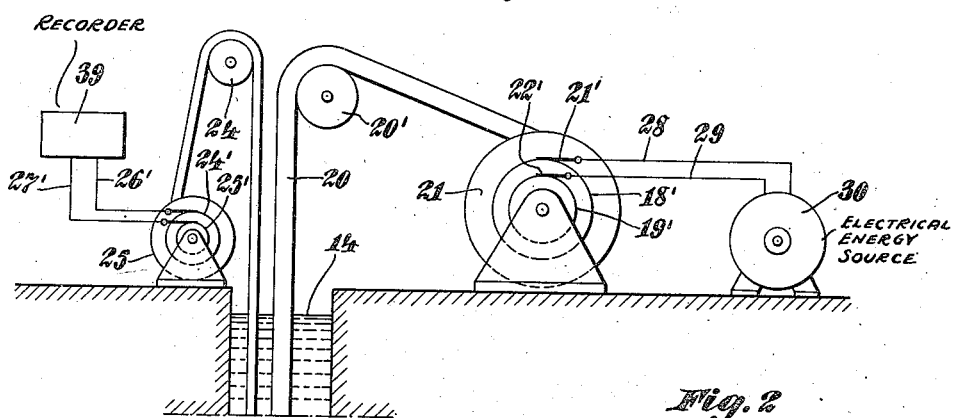
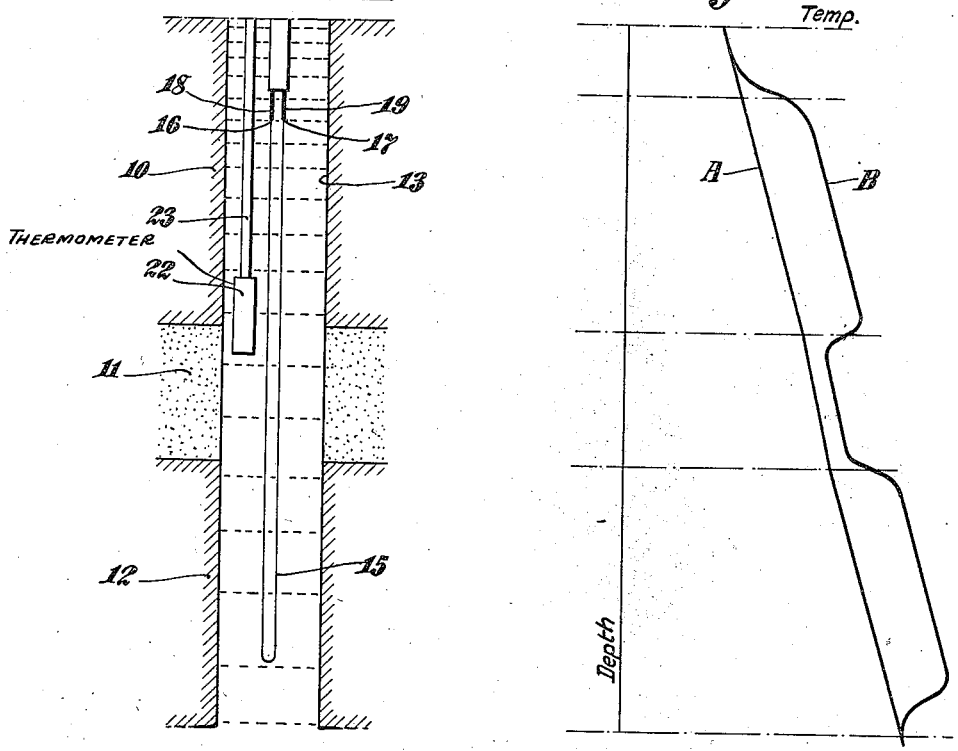
INVENTOR.
Marcel Schlumberger,
BY Hoguet, Neary & Campbell
ATTORNEYS

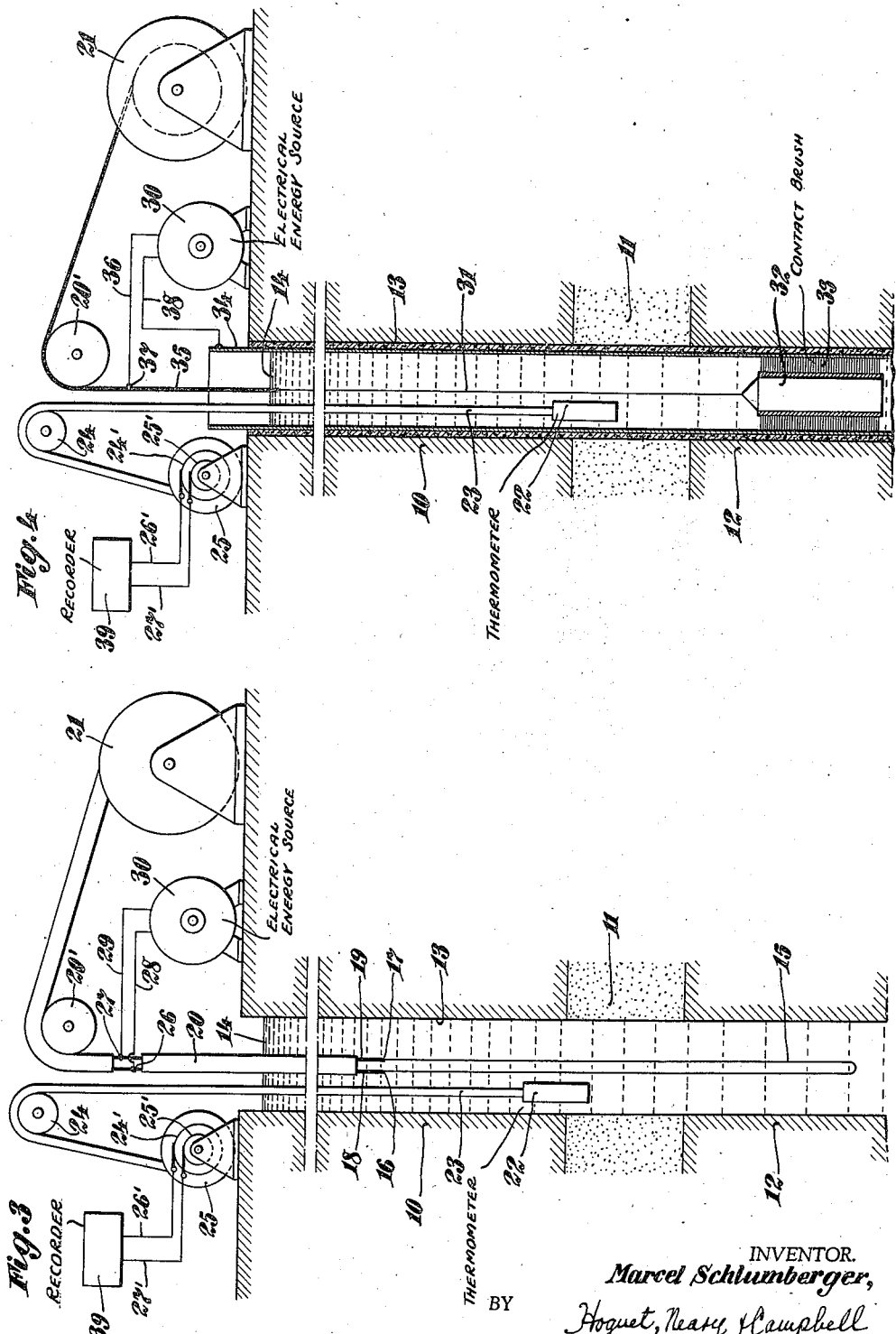

UNITED STATES PATENT OFFICE 2,290,075

THERMAL PROCESS AND DEVICE FOR SURVEYING THE BEDS TRAVERSED BY DRILL HOLES

Marcel Schlumberger, Paris, France, assignor, by mesne assignments, to Schlumberger Well Surveying Corporation, Houston, Tex., a corporation of Delaware Application April 3, 1939, Serial No. 265,742
In France April 8, 1938

8 Claims. (Cl. 73—51)

This invention relates to methods and apparatus for determining the nature of earth formations traversed by a bore hole. More specifically, it relates to an improved method and apparatus for determining the nature of earth formations by obtaining indications of their thermal properties.

It is well known that the earth formations traversed by a drill hole may be readily distinguished by their relative thermal properties. For example, porous formations permeated with fluid are generally characterized by a high apparent thermal conductivity, caused apparently by convection currents produced in the fluid permeating the formations when the latter are brought into contact with a medium of different temperature. Impervious formations on the other hand are generally characterized by low thermal conductivity probably because their fluid content is low and the influence of convection currents is correspondingly reduced.

Processes are already known for measuring the thermal properties of the strata traversed by a bore hole. In one such method, for example, it is proposed to fill the hole with liquid having a temperature considerably different from the natural temperature of the formations traversed by the bore hole. After allowing the heat contained in the fluid to flow into the strata surrounding the bore hole for a given period of time, the variation of the temperature of the bore hole fluid with depth is determined, from which the relative thermal properties of the surrounding formations may be ascertained.

While this method does provide useful information about the nature of the earth formations, it has been found to be somewhat unsatisfactory because it necessitates emptying the bore hole and refilling it with fluid of higher temperature than the natural temperature of the beds and is, therefore, costly and time consuming.

It has also been proposed to generate heat in a localized zone in a bore hole, thereafter measuring the temperature of the bore hole liquid in order to obtain information about the thermal properties of the strata surrounding the bore hole. This method also gives valuable information, but it has been found that the results are somewhat modified due to the fact that the heating element and the temperature measuring device are moved through the bore hole together, so that the thermal distribution in the bore hole fluid is disturbed and not uniform.

The principal object of the present invention is to provide an improved method and apparatus for determining the thermal properties of earth formations traversed by a bore hole in which heat is generated uniformly in an extended portion of the bore hole, enabling the nature of the formations to be obtained in a simple and effective manner, and with greater accuracy than has been possible heretofore.

A further object of the invention is to provide a method and apparatus of the above character in which the heating element is maintained in a fixed position in the bore hole and in which bore hole temperature measurements are made by moving a temperature responsive device through the bore hole in the portion influenced by the heating element.

The method of the invention comprises essentially the steps of heating in situ the liquid contained in an extended portion of the drill hole, and obtaining indications of temperature variations in the bore hole fluid resulting from the absorption of heat therefrom by the formations surrounding the bore hole. In the neighborhood of porous beds, considerable quantities of heat are absorbed from the bore hole fluid in a given period of time, so that the temperature of the bore hole fluid near such beds remains relatively unchanged. Adjacent impermeable formations, however, relatively little heat is absorbed from the bore hole fluid, so that its temperature tends to rise. Accordingly, by measuring the temperature variations in the fluid contained in the bore hole, the thermal properties of the surrounding formations may be readily determined.

Inasmuch as the temperature of the formations surrounding the bore hole normally tends to increase with depth, it is ordinarily desirable to make a temperature run before the fluid in the bore hole has been heated, in order to provide a standard of comparison with which subsequent temperature measurements may be compared.

The heating of the bore hole fluid may be accomplished in any known manner, provided only that the quantity of heat generated is equally distributed along the portion of the bore hole being investigated. Thus, chemicals may be lowered into the bore hole for the purpose of producing exothermic chemical reactions therein in order to generate heat. It is preferred, however, to generate heat in the bore hole by passing current through electrical resistances, which may be immersed in the bore hole fluid.

The invention may be better understood from the following detailed description, taken in connection with the accompanying drawings in which Fig. 1 is a schematic diagram of apparatus constructed in accordance with the invention, for determining the thermal properties surrounding an uncased bore hole;

Fig. 2 is a curve of temperature against depth in the bore hole, illustrating the manner in which porous strata may be readily identified;

Fig. 3 is a schematic diagram of a modification of the apparatus illustrated in Fig. 1; and Fig. 4 is a schematic diagram of apparatus constructed in accordance with the invention for determining the thermal properties of formations surounding a cased and cemented drill hole.

Considering the embodiment illustrated in Fig. 1, an impervious formation 10 of relatively low thermal conductivity is shown, above a porous formation 11 of relatively high thermal conductivity, beneath which lies a second impervious formation 12 also of relatively low conductivity, all three formations being penetrated by a bore hole 13. The drill hole 13 contains the liquid or mud 14 which should preferably be viscous enough to prevent the transmission of heat by convection parallel to the axis of the drill hole, but yet not so viscous as to prevent the equalization of the temperature in any given portion of the bore hole.

The heating element may comprise, for example, an elongated wire 15 which is bent back on itself, and whose upper ends 16 and 17 are connected to a pair of conductors 18 and 19 of relatively large cross-section. The conductors 18 and 19 are contained in an insulated cable 20, which passes over a sheave 20' and which is wound in the usual manner upon a winch 21, by means of which the heating element 15 may be raised and lowered in the bore hole.

The ends of the conductors 18 and 19 may be connected to the slip rings 18' and 19' which in turn are connected through the brushes 21' and 22' and the wires 28 and 29, respectively, to a source of current 30 which provides electrical energy for generating heat in the heating element 15. In some cases, however, considerable heat losses may arise due to the high intensity current flowing through the conductors 18 and 19 in that part of the cable 20 wound on the winch 21.

To avoid possible damage to the cable, therefore, and to eliminate the power losses in this part of the cable, it may be preferable to connect the wires 28 and 29 directly to cable 20 at a place between the winch and the mouth of the bore hole, as shown in Fig. 3. This may be accomplished by stripping a small portion of the insulation from the cable 20 and connecting the wires 28 and 29 to the conductors 18 and 19 at 26 and 27, respectively.

Where this alternative is used, it is possible to dispense with the wires of large cross-section 18 and 19 in which case the heating element 15 will be directly connected to the source 30 at the surface of the earth. Where this is done, however, the heating element 15 should be of sufficient length to reach the lowest depth at which measurements of temperature are contemplated.

The heating element 15 is preferably made equal in length to the length of the portion of the bore hole which it is desired to investigate and since it comprises a uniform wire of constant resistance, it generates heat uniformly at a constant rate along its entire length.

The temperature of the liquid contained in the bore hole may be measured by any suitable temperature measuring device 22, such as for example, the temperature measuring devices disclosed in United States Patents Nos. 2,249,751 and 2,238,015 to H. G. Doll, issued July 22, 1941, and April 8, 1941, respectively. The temperature measuring device 22 is adapted to be moved through the bore hole 13 by the cable 23 which passes over a sheave 24 and which is wound on an auxiliary winch 25 at the earth's surface in the usual manner.

The measured temperatures may be recorded in the bore hole on a strip of film, for example, in which case the temperature measuring device 22 should be a recording instrument. If desired, however, the temperature measuring device 22 may be connected to a pair of conductors within the cable 23 (not shown) through the slip rings 24' and 25', respectively, and the wires 26' and 27', respectively, to a measuring or recording instrument 39 located at the earth's surface, as indicated in Figs. 1, 3 and 4.

In operation, a preliminary temperature survey may be made by lowering the temperature measuring device 22 through the bore hole, from which the curve A (Fig. 2) is obtained. It will be noticed that this curve is substantially a sloping line, indicating that the temperature of the bore hole fluid normally increases with depth. The heating element 15 is then lowered by means of the winch 21 to the desired position in the bore hole 13 at which position it is maintained during the heating step. If the connections between the heating element 15 and the source of current 30 are made as indicated in Fig. 1, then the heating element 15 will begin to generate heat as soon as the current source 30 is operated.

On the other hand, if the heating element 15 is to be directly connected to the source of current 30 at the surface of the earth, as indicated in Fig. 3, part of the insulation is stripped off the cable 20 and the wires 18 and 19 are connected at 26 and 27 through wires 28 and 29 to a source of current 30. As pointed out above, by making the connection between the current source 30 and the cables 18 and 19 in this manner, a considerable saving in power results because heat losses produced by the passage of current through the length of the cable on the winch 21 are eliminated. The heating element 15 now begins to generate heat uniformly at a constant rate over its entire length.

It will be understood that heat need not be generated at a constant rate during the run, but the rate of generation might vary as a function of time, provided that heat is generated uniformly over the entire portion of the bore hole being investigated.

In the neighborhood of impermeable beds of relatively low apparent thermal conductivity, the greater part of the heat generated accumulates in the liquid contained in the bore hole, so that its temperature tends to rise above the normal value. In adjacent beds of higher apparent thermal conductivity such as, for example, porous beds, the heat generated is almost entirely transmitted through the bed and relatively little remains in the liquid contained in the drill hole. Accordingly, the bore hole liquid temperature remains substantially unchanged, or increases very slowly.

The heating step is continued until beds of relatively high thermal conductivity may be readily differentiated from beds of relatively low thermal conductivity by observing variations in the temperature of the liquid contained in the bore hole. The temperature measuring device 22 is then moved through the bore hole over the length under investigation and a curve similar to curve B (Fig. 2) is obtained. It will be noted from this curve that adjacent the impermeable beds 10 and 12 of relatively low thermal conductivity, the temperature of the bore hole fluid is considerably greater than the normal bore hole temperature, as indicated by curve A, whereas in the neighborhood of the porous formation 11, it is only slightly higher than the normal bore hole temperature for this particular region, as indicated by curve A.

Inasmuch as the casing with which the bore holes are usually provided does not interfere substantially with the heat exchange between the fluid in the bore hole and the surrounding strata, the method of the invention may be readily applied to cased bore holes as well as uncased holes. It has been found that the presence of the casing merely modifies the shape of the curve obtained by smoothing out the irregularities. It is believed that this results because in a cased hole, a larger proportion of heat is transmitted in a direction parallel to the axis of the bore hole than where no casing is present. The method may likewise be applied to bore holes provided with a cemented casing, since the thickness of the cement produces no appreciable effect on the heat exchange between the bore hole fluid and the surrounding strata.

Referring now to Fig. 4, a further embodiment of the invention is disclosed in which the method of the invention is applied to a cased and cemented bore hole. In this embodiment, the heating element comprises a single conductor 31, at the lower end of which a cylindrical conducting member 32 is secured. The conducting member 32 is provided with a plurality of radial contacting elements 33 forming a brush engaging the metallic casing 34. The conductor 31 is connected at its upper end to a conductor 35 of relatively large cross-section which passes over the sheave 20' at the earth's surface and which is wound on the winch 21, by means of which it may be raised or lowered within the bore hole 13.

The heating element 31 is energized from the source 30 through a wire 36 which is connected to the cable 35 at a point 37, the other terminal of the source 30 being connected through a wire 38 to the top of the metallic casing 34, so that the casing 34 provides a return conductor for the heating element 31. This embodiment operates in essentially the same manner as described above in connection with Figs. 1 and 3.

It will be evident from the foregoing that the invention enables the relative thermal properties of the strata traversed by a bore hole to be determined with a greater accuracy than has been possible heretofore. By reason of the fact that the heat is generated at a uniform rate in the drill hole and a uniform heat distribution is set up along the entire length to be investigated, the temperature measurements obtained are more clearly indicative of the thermal properties of the surrounding strata.

While several specific embodiments have been described above, the invention is not intended to be in any way limited thereby, but is susceptible of numerous changes in form and detail within the scope of the appended claims.

I claim:

1. The method of determining the nature of earth formations traversed by a bore hole which comprises the steps of generating heat uniformly and simultaneously along an extended portion of the bore hole, and obtaining indications of the rate of transmission of the generated heat through the formations surrounding the bore hole in said portion, whereby their relative thermal properties may be ascertained.

2. The method of determining the nature of earth formations traversed by a bore hole which comprises the steps of generating heat uniformly and simultaneously at a constant rate along an extended portion of the bore hole, and obtaining indications of temperature variations in said portion of the bore hole, whereby the relative thermal properties of the earth formations surrounding said portion of the bore hole may be ascertained.

3. The method of determining the nature of earth formations traversed by a bore hole containing liquid, which comprises the steps of initially obtaining indications of temperature variations in an extended portion of the bore hole, generating heat uniformly and simultaneously along said bore hole portion, and subsequently obtaining indications of temperature variations in said portion of the bore hole, whereby the relative thermal properties of the formations surrounding said bore hole portion may be ascertained.

4. Apparatus for generating heat uniformly in an extended portion of a bore hole, comprising a U-shaped electrical heat generating conductor of considerable length, a cable for moving said conductor through the bore hole, a source of electrical energy at the surface of the earth, and electrical connections in said cable for connecting said source to said conductor.

5. Apparatus for generating heat uniformly in an extended portion of a bore hole lined with a conductive casing, comprising a heat generating conductor of considerable length adapted to be disposed longitudinally in the bore hole, electrical contact making means connected to the lower end of said conductor and engaging said bore hole casing, a source of electrical energy at the surface of the earth and electrical connections between said source and the conductor and bore hole casing.

6. Apparatus for generating heat uniformly in an extended portion of a bore hole lined with a metallic casing comprising a heat generating conductor of considerable length adapted to be disposed longitudinally in the bore hole, a conductive brush secured to the lower end of said conductor and engaging the bore hole casing, a cable for moving said conductor and brush through the bore hole, a source of electrical energy at the surface of the earth, an electrical connection in the cable for connecting said conductor to the source, and an electrical connection between the source and the conductive casing.

7. The method of determining the nature of earth formations traversed by a bore hole containing a liquid, which comprises the steps of generating heat simultaneously, uniformly and at a known rate in the bore hole liquid along an extended portion of the bore hole, continuing the generation of heat at said points for a sufficient length of time to produce stratification of the bore hole liquid into zones of different temperature adjacent formations of different thermal properties, and obtaining indications of the temperature of the bore hole liquid at various points along said extended portion of the bore hole, whereby the relative thermal properties of the formations may be ascertained.

8. The method of determining the nature of earth formations traversed by a bore hole containing a liquid, which comprises the steps of providing electrical energy at a known location in the bore hole, converting said electrical energy to heat energy simultaneously along an extended portion of the bore hole, thereby generating heat uniformly and at a known rate in the bore hole liquid along said extended portion of the bore hole, continuing the generation of heat for a sufficient length of time to produce stratification of the bore hole liquid into zones of different temperature adjacent formations of different thermal properties and obtaining indications of the temperature of the bore hole liquid at various points along said extended portion of the bore hole, whereby the relative thermal properties of the formations may be ascertained.

MARCEL SCHLUMBERGER.